UNITED STATES PATENT OFFICE

JESSE P. HUBBELL, OF NEW ROCHELLE, NEW YORK

METHOD OF FUMIGATION

No Drawing. Application filed December 7, 1921. Serial No. 520,587.

The general object of my present invention is an improved method of destroying animal life such as the bugs and parasites which injure vegetation, and rodents or the like, by means of hydrocyanic gas.

In the preferred mode of carrying out my invention I liberate hydrocyanic acid gas in an enclosure which may be either natural or artificial and which contains the insects eggs, larvæ, rodents, or the like to be destroyed, by exposing the substance known as flaky calcium cyanide to the action of a humid atmosphere in said enclosure, moisture being supplied to the atmosphere if and when necessary to insure the desired humidity. Flaky calcium cyanide as now made is a product of the electric furnace of which the active constituent is $Ca(CN)_2$. As ordinarily marketed it is in the form of relatvely thin flakes which are grayish black in color. Flaky calcum cyanide is appreciably less deliquescent than sodium or potassium cyanide, and its flaky form as well as its chemical composition contribute to its comparatively rapid decomposition to hydrocyanc acid gas and hydrated lime when exposed to an atmosphere containing a proper amount of moisture.

In one preferred mode of treating a tree to destroy scale or the like, in accordance with the present invention, the tree is enclosed in the usual tent employed in fumigating trees with hydrocyanic acid, and the calcium cyanide may then be introduced into the tent by sprinkling it on to the ground around the tree. In this case the humidity of the atmosphere within the tent may be augmented as desired by wetting the ground either before or after sprinkling the calcium cyanide on the ground. In this mode of treatment the flaky calcium cyanide may be sprinkled on the ground in its initial condition although of course it may be crushed or powdered before being spread over the ground. In lieu of sprinkling the cyanide on the ground it may be injected into the tent in powder form by means of a dust gun or the like, and in such case the atmosphere within the tent may be humidified to the desired extent by injecting steam into the tent, or by spraying water mist into the tent by means of an atomizer. The use of steam or water mist facilitates generation of the hydrocyanic acid gas from the dust, and also facilitates the dispersion of the gas throughout the atmosphere within the tent, and in addition increases and permits of a regulative control of the humidity of the atmosphere. The use of steam as distinguished from water mist tends to increase the temperature within the tent, which is desirable in some cases. The invention as a whole facilitates and reduces the cost of fumigation and from a practical commercial standpoint materially increases the filling efficiency of the gas used so that somewhat less hydrocyanic acid gas is required in fumigating vegetation in accordance with the present invention than is required with previously known methods.

In treating trees in accordance with the present invention, as in other methods of treating them with hydrocyanic acid gas, moisture in the form of dew drops or rain drops on the leaves of trees at the time of treatment is objectionable since such drops of moisture absorb the gas and the tree may be injured or killed by the gas thus absorbed by the drops of moisture. To avoid injuring vegetation in this way I consider it ordinarily advisable in treating trees in accordance with the present invention to follow the usual practice in fumigating with hydrocyanic acid gas and treat the trees only when the latter are comparatively dry and at such times the humidity of the general atmosphere is ordinarily relatively low. I depart from the usual practice, however, in artificially augmenting the humidity of the atmosphere to the desired degree if necessary. In practicing the present invention I consider a relatively high degree of humidity highly desirable if not essential to the desired rapidity of generation of hydrocyanic acid gas. In general, moreover, I consider it advantageous in fumigating with hydrocyanic acid however it may be generated, to operate with a humid atmosphere as I believe this improves the fumigation effect obtainable with a given amount of acid. An incidental advantage of a relatively high humidity in treating vegetation in cloth tents is that the moisture in the atmosphere tends to render the tent cloth less pervious to gas leakage. In general I consider it desirable that the moisture in the atmosphere should approach the saturation point but this point should not be reached and generally speaking, a considerable margin of safety is advisable. In ordinary practice I prefer that the moisture content of the atmosphere should be something like 75% of that required to produce saturation.

The quantity of calcium cyanide required in treating a tree in accordance with the present invention is that which will furnish about the same amount of hydrocyanic acid gas as would be required with the previously known methods of fumigating the tree with hydrocyanic acid gas.

In destroying rodents such as gophers, for example, I place an ounce or two of calcium cyanide in the burrow or gopher hole, and then stop up the outlets from the burrow. Advantageously, straw, grass, or the like, is placed over the deposited calcium cyanide so that the earth used in closing the burrow will not cover the cyanide and interfere with the rapidity of decomposition. Ordinarily the atmosphere in the burrow is sufficiently humidified by the natural moisture in the earth to make artificial humidification unnecessary. In case, however, the burrow is in very dry soil, some water may advantageously be poured into the burrow or on to the earth in immediate proximity thereto to create the desired humidity of the atmosphere in the burrow when the latter is stopped up after calcium cyanide has been placed therein.

Having now described my invention, what I claim as new and desire to secure by Letters Patent, is:

1. The method of fumigating which consists in exposing dry calcium cyanide to the action of an atmosphere having sufficient humidity to decompose said cyanide and thereby liberate hydrocyanic acid gas at a rate effective to secure the desired fumigation effect.

2. The method of fumigating an enclosed space exposing dry calcium cyanide to the action of an atmosphere in said space having sufficient humidity to decompose said cyanide and thereby liberate hydrocyanic acid gas at a rate effective to secure the desired fumigation effect.

3. The method of fumigating which consists in dispersing calcium cyanide in pulverulent form in an atmosphere having sufficient humidity to decompose the cyanide and thereby liberate hydrocyanic acid gas at a rate effective to secure the desired fumigation effect.

4. The method of fumigating a space which consists in exposing dry calcium cyanide to the action of the atmosphere in said space and modifying the humidity of said atmosphere to thereby regulate the rate at which said cyanide decomposes and hydrocyanic acid gas is evolved.

5. The method of fumigating a space which consists in exposing dry calcium cyanide to the atmosphere in said space and adding to said atmosphere an agent to accelerate the decomposition of the cyanide and the resultant evolution of hydrocyanic acid gas.

6. The method of fumigating vegetation which consists in dispersing calcium cyanide in pulverulent form in the atmosphere immediatly surrounding said vegetation and adding moisture to said atmosphere to accelerate the decomposition of the cyanide and the resultant evolution of hydrocyanic acid gas.

7. The method of fumigating an enclosed space with hydrocyanic acid gas which consists in dispersing calcium cyanide in pulverulent form in said space and supplying moisture in the form of a vapor or mist to said space to thereby accelerate the decomposition of the cyanide and the resultant evolution of hydrocyanic acid gas.

8. The method of fumigating vegetation with hydrocyanic acid gas which consists in enclosing said vegetation, adding moisture to the atmosphere within the enclosure to render the moisture content thereof approximately 75% of that required to produce saturation and liberating hydrocyanic acid gas in the enclosed space.

9. The method of fumigating vegetation with hydrocyanic acid gas which consists in enclosing said vegetation by a cloth tent when the moisture content of the atmosphere in the space enclosed by the tent is appreciably below 75% of that required to produce saturation and adding moisture to said atmosphere to render the moisture content thereof approximately 75% of that required to produce saturation and liberating hydrocyanic acid gas in said space.

10. In fumigating vegetation with hydrocyanic acid gas enclosing the vegetation in a tent enclosure, and supplying hydrocyanic acid gas and steam to said enclosure to provide a humid atmosphere therein containing hydrocyanic acid gas in toxic concentration.

11. A method of fumigating which comprises providing a subdivided mass of a cyanide and exposing the same to moist air having a relative humidity over 30% to produce poisonous gas in toxic concentrations by hydrolysis of the said cyanide.

12. A fumigant comprising calcium cyanide and capable of decomposing at atmospheric temperatures in the presence of moisture and liberating a poisonous gas in toxic concentrations.

13. A fumigant comprising calcium cyanide and capable of decomposing at atmospheric temperatures in the presence of air having a relative humidity over 30% and liberating a poisonous gas in toxic concentrations.

14. A fumigant comprising calcium cyanide and capable of decomposing at atmospheric temperatures in the presence of moisture and liberating a poisonous gas, the decomposition being substantially complete in a few hours.

15. A pesticide in the form of a dust comprising calcium cyanide capable of decomposing at atmospheric temperatures in the presence of moisture, the decomposition being substantially complete within a few hours.

Signed at New York City in the county of New York and State of New York this 6th day of December A. D. 1921.

JESSE P. HUBBELL.